(12) United States Patent
Yamamoto et al.

(10) Patent No.: US 7,715,111 B2
(45) Date of Patent: May 11, 2010

(54) PROJECTION ZOOM LENS SYSTEM AND PROJECTION TYPE DISPLAY APPARATUS

(75) Inventors: Chikara Yamamoto, Saitama (JP); Masaru Amano, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/362,022

(22) Filed: Jan. 29, 2009

(65) Prior Publication Data

US 2009/0219624 A1   Sep. 3, 2009

(30) Foreign Application Priority Data

Feb. 29, 2008   (JP)   .............. P2008-050335

(51) Int. Cl.
  *G02B 15/14*   (2006.01)
(52) U.S. Cl. .............. 359/684; 359/649; 359/650; 359/651; 359/680; 359/681; 359/682; 359/683; 359/686; 359/713; 359/740; 359/761
(58) Field of Classification Search ......... 359/649–651, 359/680–684, 686, 713, 740, 756, 761
See application file for complete search history.

(56) References Cited

U.S. PATENT DOCUMENTS

| | | | | |
|---|---|---|---|---|
| 6,801,367 | B2 * | 10/2004 | Nagahara | 359/680 |
| 7,016,118 | B2 * | 3/2006 | Wada | 359/676 |
| 7,079,324 | B2 * | 7/2006 | Yamasaki | 359/680 |
| 7,190,528 | B2 * | 3/2007 | Inoko | 359/649 |
| 7,403,339 | B2 * | 7/2008 | Inoko | 359/680 |
| 7,558,002 | B2 * | 7/2009 | Yamada et al. | 359/676 |
| 7,576,923 | B2 * | 8/2009 | Inoko | 359/680 |
| 7,586,690 | B2 * | 9/2009 | Yamada | 359/680 |
| 2001/0050818 | A1 * | 12/2001 | Wada et al. | 359/649 |
| 2007/0223103 | A1 * | 9/2007 | Yamamoto | 359/683 |

FOREIGN PATENT DOCUMENTS

JP   2003-337283 A   11/2003
JP   2005-84455 A   3/2005

* cited by examiner

*Primary Examiner*—Evelyn A. Lester
(74) *Attorney, Agent, or Firm*—Birch, Stewart, Kolasch & Birch, LLP

(57) ABSTRACT

The projection zoom lens system includes a negative first lens group, a positive second lens group, a third lens group, a positive fourth lens group, a fifth lens group, and a positive sixth lens group. The lens system is nearly telecentric on a reduction side. During zooming, the second to fifth lens groups are moved while the first and six lens groups remain stationary. The third lens group includes a positive lens $L_P$ having a convex surface directed to a magnification side, and a negative lens $L_N$ having a concave surface which is directed to the reduction side and has a curvature stronger than a magnification-side surface of the negative lens $L_N$. The conditional expression of $5.0 \leq |f_{G3}/R_{LN-2}|$ is satisfied. Here, $f_{G3}$ denotes a focal length of the third lens group, and $R_{LN-2}$ denotes a radius of curvature of the reduction-side surface of the negative lens $L_N$.

13 Claims, 9 Drawing Sheets

FIG. 1 Example 1

FIG. 2
Example 2
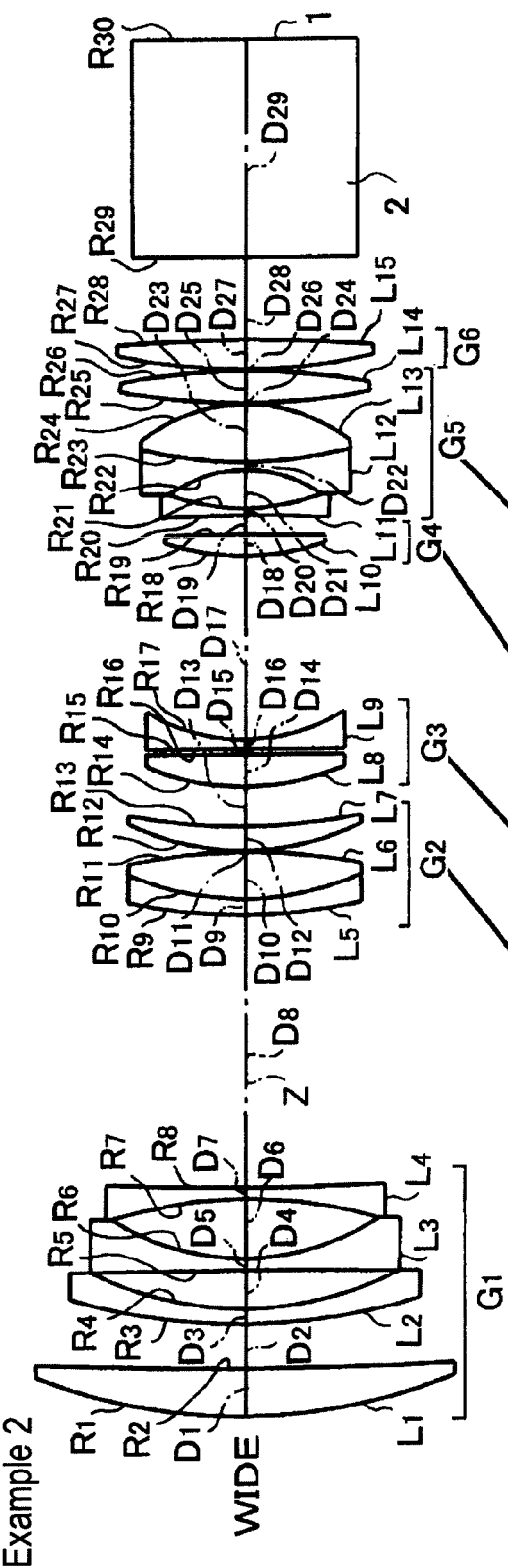
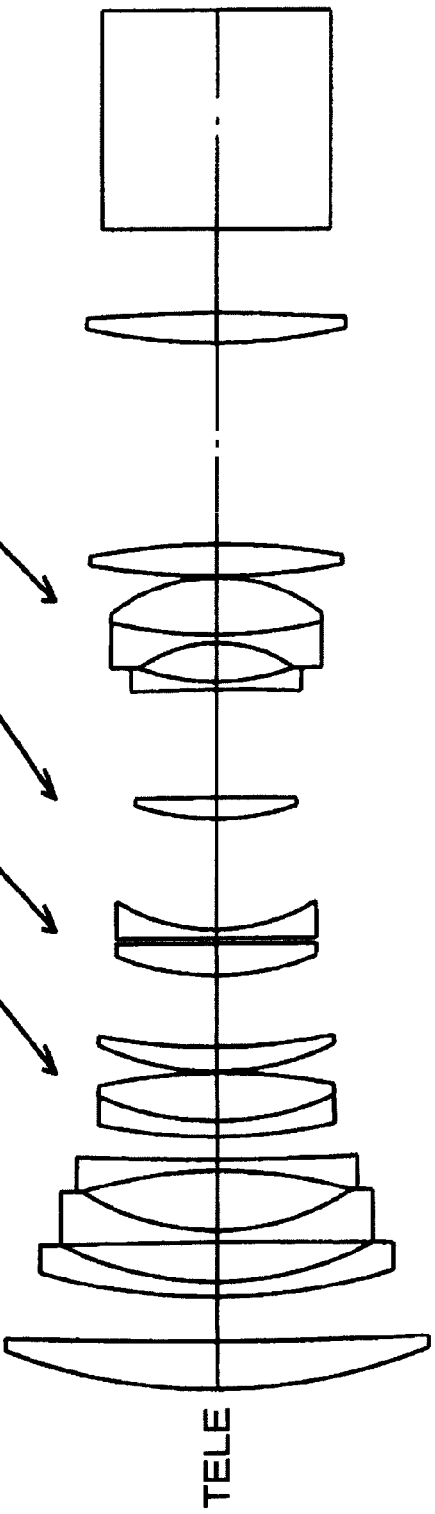
WIDE
TELE

FIG. 3 Example 3

Example 4

FIG. 5
Example 1 (WIDE)
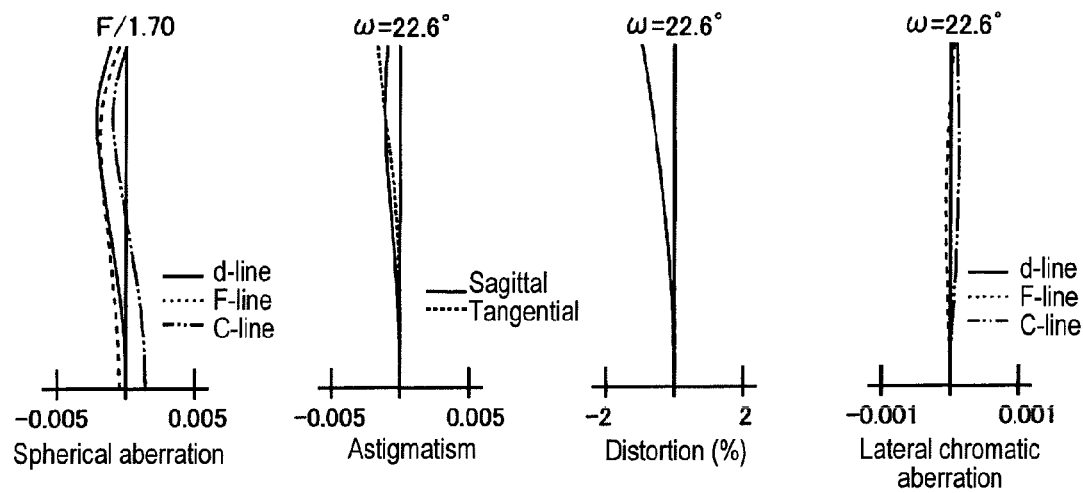
Example 1 (TELE)
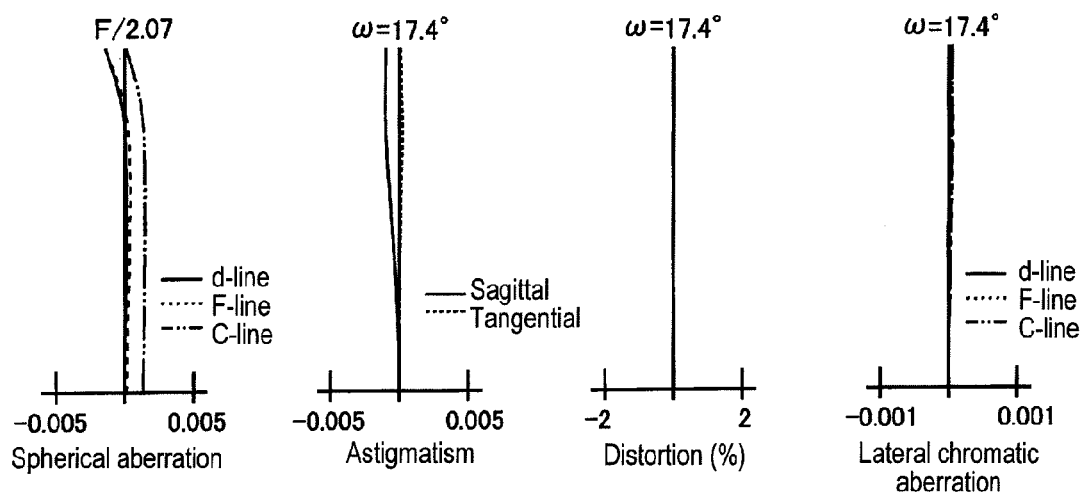

FIG. 6
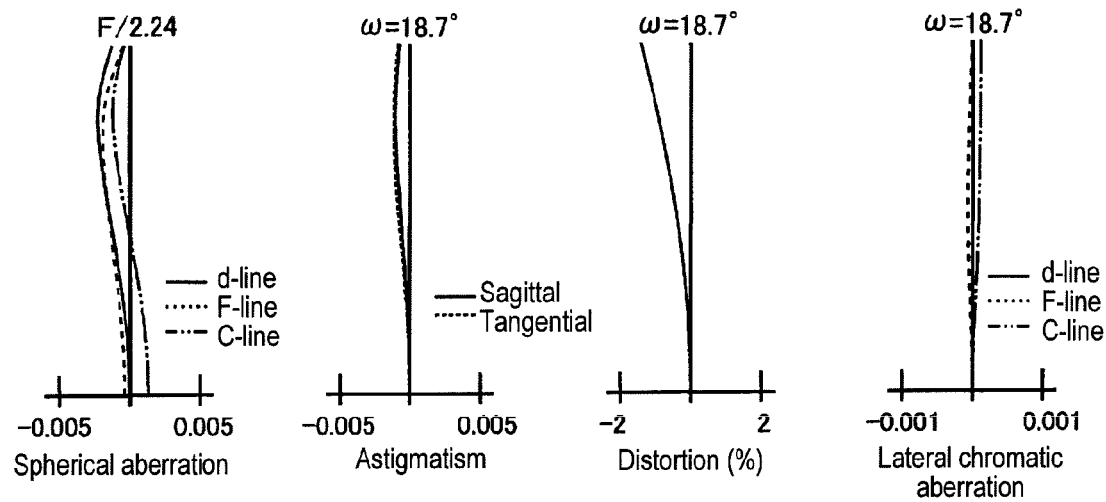
Example 2 (WIDE)
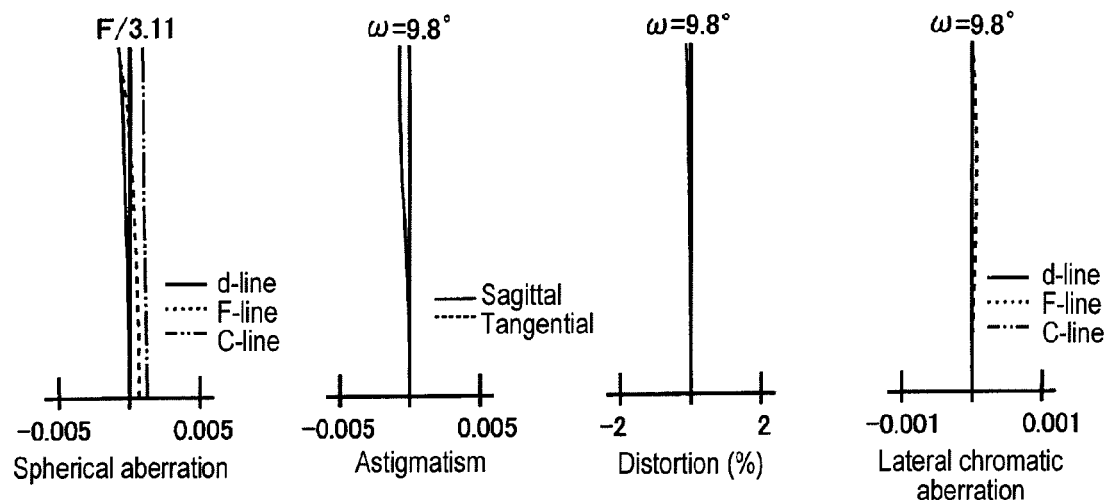
Example 2 (TELE)

FIG. 7
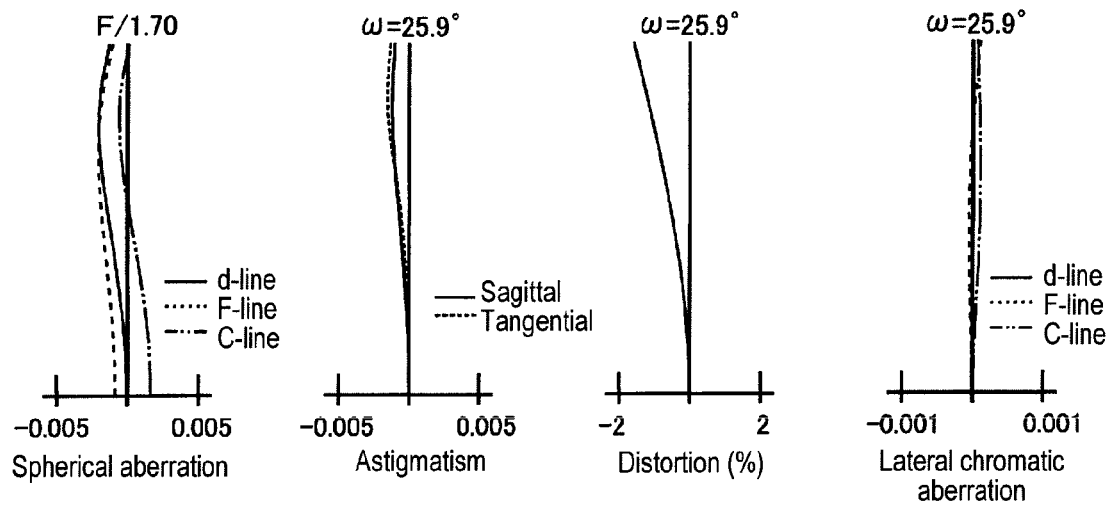
Example 3 (WIDE)
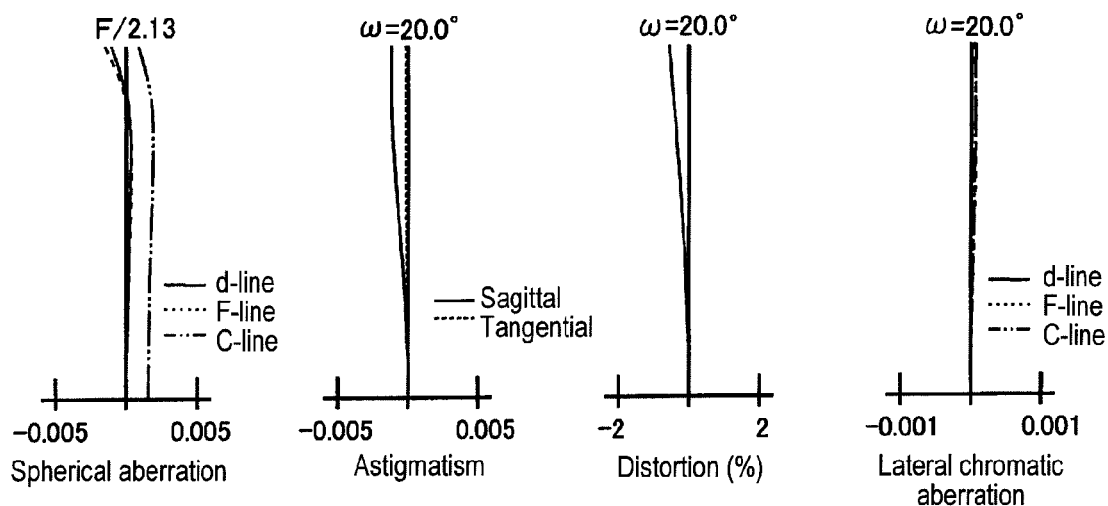
Example 3 (TELE)

FIG. 8
Example 4 (WIDE)
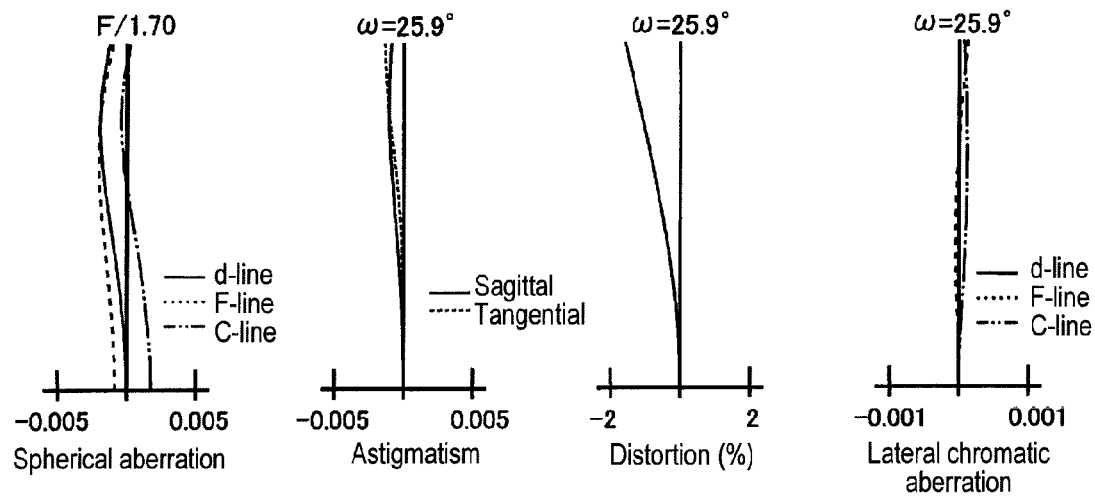
Example 4 (TELE)
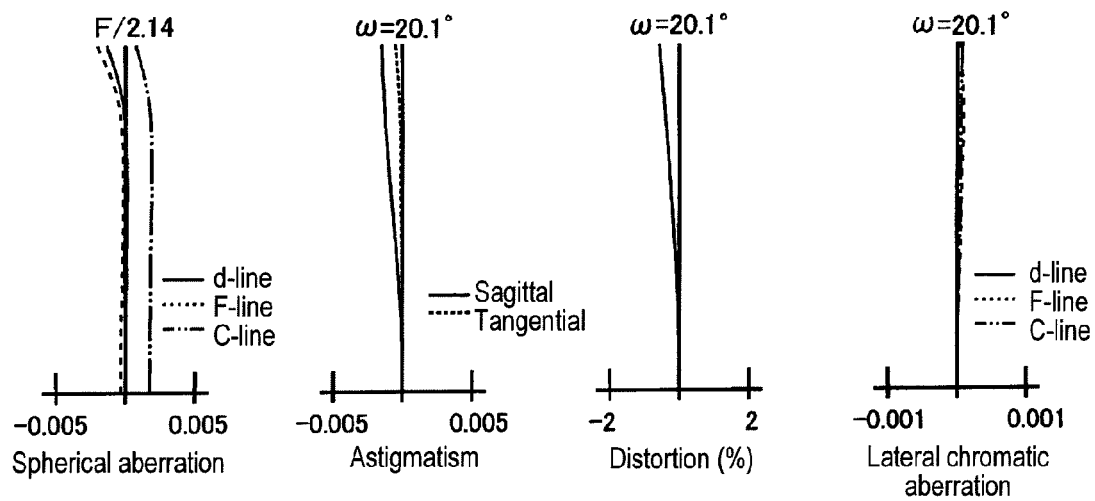

d

PROJECTION ZOOM LENS SYSTEM AND PROJECTION TYPE DISPLAY APPARATUS

CROSS-REFERENCE TO RELATED APPLICATIONS

This application is based upon and claims the benefit of priority from the Japanese Patent Application No. 2008-50335 filed on Feb. 29, 2008; the entire contents of which are incorporated herein by reference.

BACKGROUND OF THE INVENTION

1. Technical Field

The invention relates to a projection zoom lens system having a six-group configuration and a projection type display apparatus having the projection zoom lens system. In particular, the invention relates to a projection zoom lens system configured to project and magnify onto a screen, rays which contain image information and are generated from a light valve such as a liquid crystal display device or a DMD (Digital Micromirror Device) display device, and a projection type display apparatus having the projection zoom lens system.

2. Description of the Related Art

Recently, beam projectors (projection display devices) using light valves such as transmissive or reflective liquid crystal display devices or DMD display devices have come into widespread use and have become sophisticated. Particularly, as a resolution of the light valves increases, a demand for improvement in resolution of the projection lens system has increased.

Furthermore, considering improvement in a degree of freedom at the time of setting a distance to a screen and installability in a small room, a demand for mounting a wide zoom lens system or a high-power zoom lens system having compactness and higher performance onto a projection type display apparatus has also increased.

To meet the demands mentioned above, JP 2003-337283 A has proposed the following projection zoom lens system. This zoom lens system is configured so as to improve an optical performance in the whole zooming range from a wide-angle end to a telephoto end by increasing the number of moving groups in the zoom lens system. However, there arise such problems that fluctuation of the spherical aberration accompanied by zooming is large and that a marginal ray tends to be largely under especially at the telephoto end.

Then, as described in JP 2005-84455 A, there has been proposed a projection zoom lens system configured to reduce fluctuation of the spherical aberration accompanied by zooming by providing a surface having a strong negative refractive power in a third lens group of the zoom lens system having six groups.

However, in the projection zoom lens system described in JP 2005-84455 A, fluctuation of the spherical aberration accompanied by zooming decreases, but a problem arises that the astigmatism increases.

SUMMARY OF THE INVENTION

The invention has been made in view of the above circumstances, and provides a high-resolution projection zoom lens system capable of reducing the astigmatism while reducing fluctuation of the spherical aberration accompanied by zooming. The invention also provides a projection type display apparatus having the projection zoom lens system.

According to an aspect of the invention, a projection zoom lens system includes, in order from a magnification side, a first lens group having a negative refractive power, a second lens group having a positive refractive power, a third lens group having a positive or negative refractive power, a fourth lens group having a positive refractive power, a fifth lens group having a positive or negative refractive power, and a sixth lens group having a positive refractive power. The projection zoom lens system is configured to be nearly telecentric on a reduction side. During zooming, four lens groups including the second to fifth lens groups are moved while the first and sixth lens groups remain stationary. The third lens group includes, at least, positive lens $L_P$ having a convex surface directed to the magnification side, and a negative lens $L_N$ having a concave surface directed to the reduction side. The concave surface has a curvature larger than a magnification-side surface of the negative lens $L_N$. The following conditional expression (1A) is satisfied:

$$5.0 \leq |f_{G3}/R_{LN-2}| \tag{1A}$$

where $f_{G3}$ denotes a focal length of the third lens group, and $R_{LN-2}$ denotes a radius of curvature of the reduction-side surface of the negative lens $L_N$.

In the projection zoom lens system, it is preferable that the following conditional expression (2) is satisfied.

$$|R_{LN-2}/R_{LN-1}| \leq 0.8 \tag{2}$$

where $R_{LN-1}$ denotes a radius of curvature of the magnification-side surface of the negative lens $L_N$.

It is preferable that the third lens group consists of the positive lens LP and the negative lens LN, and that the positive lens LP and the negative lens LN are arranged in order from the magnification side.

In this case, it is preferable that the positive lens LP and the negative lens LN are disposed with a given airspace therebetween, and that a reduction-side surface of the positive lens LP and the magnification-side surface of the negative lens LN are formed of flat surfaces.

Alternatively, the positive lens LP and the negative lens LN may be cemented to each other.

Also, it is preferable that the sixth lens group consists of one positive lens, and that the following conditional expression (1B) is satisfied.

$$|f_{G3}/R_{LN-2}| \leq 100.0 \tag{1B}$$

Also, it is preferable that the following conditional expression (3) is satisfied:

$$1.5 \leq |f_{G3}/f_{G4}| \tag{3}$$

where fG4 denotes a focal length of the fourth lens group.

According to another aspect of the invention, a projection type display apparatus includes a light source, a light valve, an illumination optical unit that guides a light beam emitted from the light source to the light valve, and the projection zoom lens system. The light beam emitted from the light source is optically modulated by the light valve, and is projected onto a screen by the projection zoom lens system.

The above-mentioned configuration of the projection zoom lens system according to the one aspect of the invention has the following advantages.

In a general projection zoom lens system configured to be nearly telecentric on the reduction side, it is required to secure a lens back (back focal length) in which a color synthesizing unit and an optical splitting unit for splitting illuminating light and projection light can be disposed. Accordingly, the lens system is generally configured so that the most-magnification-side lens group has a large negative power. Hence, a height of an axial marginal ray increases in lens groups disposed on the magnification side.

In the projection zoom lens system according to the one aspect of the invention, the negative lens $L_N$, which satisfies the conditional expression (1A) and includes the concave surface having the negative power, is disposed in the third lens group disposed close to the magnification side. With such a configuration, an axial marginal ray associated with the spherical aberration can be corrected at a position where a ray height is large. Thus, it is possible to effectively correct marginal rays, and it is also possible to reduce fluctuation of the spherical aberration accompanied by zooming. In addition, the concave surface of the negative lens $L_N$ is disposed to direct to the reduction side. Thereby, it is possible to reduce the astigmatism.

BRIEF DESCRIPTION OF THE DRAWINGS

FIG. 2 is a schematic diagram illustrating the configuration of a projection zoom lens system according to Example 2.

FIG. 5 is aberration diagrams illustrating various aberrations (the spherical aberration, the astigmatism, the distortion, and the lateral chromatic aberration) of the projection zoom lens system according to Example 1 at the wide-angle end (a magnification: 79 times) and the telephoto end (a magnification: 60 times).

FIG. 6 is aberration diagrams illustrating various aberrations (the spherical aberration, the astigmatism, the distortion, and the lateral chromatic aberration) of the projection zoom lens system according to Example 2 at the wide-angle end (a magnification: 84 times) and the telephoto end (a magnification: 83 times).

FIG. 7 is aberration diagrams illustrating various aberrations (the spherical aberration, the astigmatism, the distortion, and the lateral chromatic aberration) of the projection zoom lens system according to Example 3 at the wide-angle end (a magnification: 79 times) and the telephoto end (a magnification: 60 times).

FIG. 8 is aberration diagrams illustrating various aberrations (the spherical aberration, the astigmatism, the distortion, and the lateral chromatic aberration) of the projection zoom lens system according to Example 4 at the wide-angle end (a magnification: 79 times) and the telephoto end (a magnification: 60 times).

DETAILED DESCRIPTION OF EMBODIMENTS OF THE INVENTION

Figure 1:
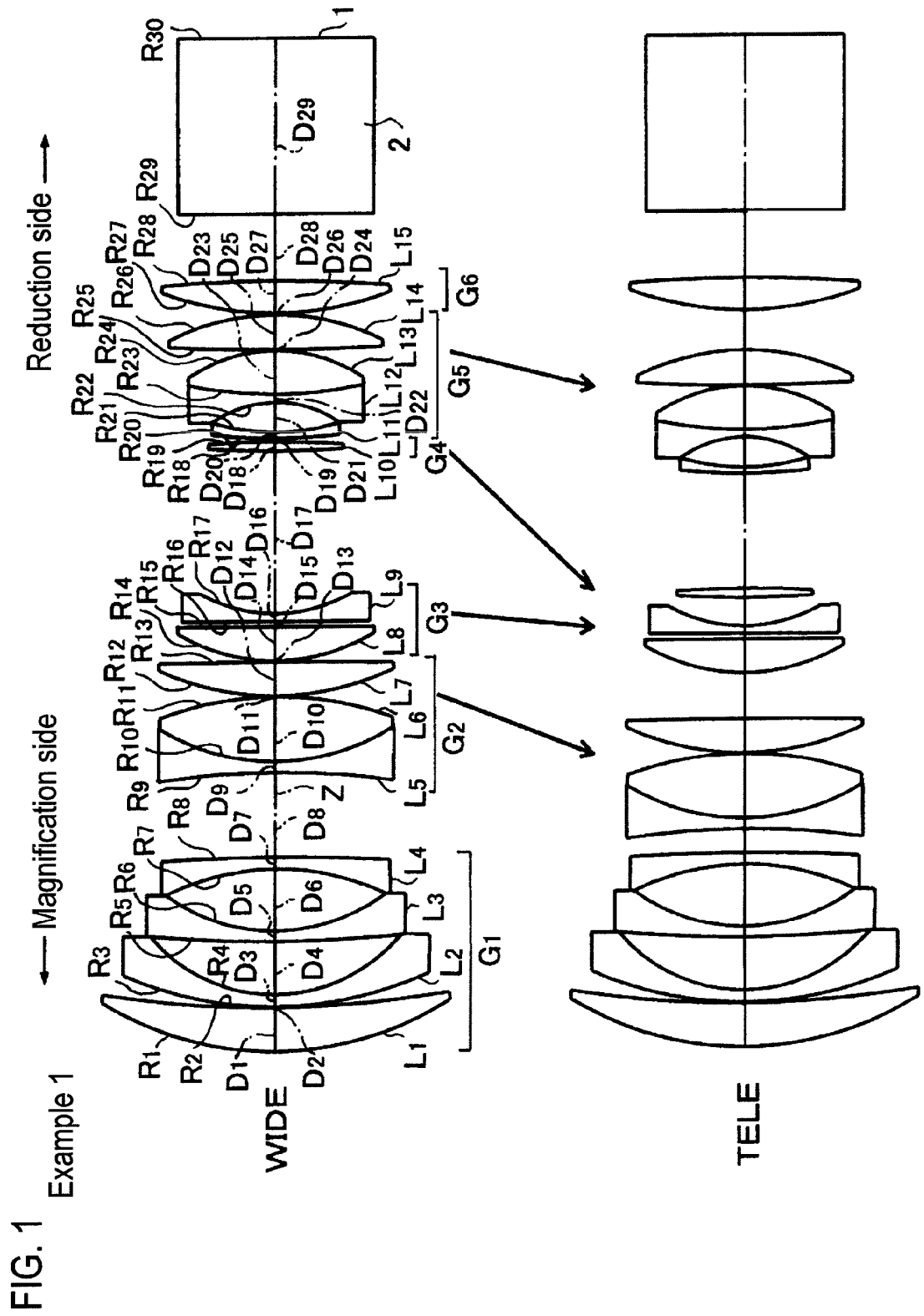
FIG. 1 is a schematic diagram illustrating the configuration of a projection zoom lens system according to Example 1.

Hereinafter, embodiments of the invention will be described in detail with reference to the attached drawings. The projection zoom lens system of an embodiment (which representatively shows the lens system according to Example 1 at the wide-angle end) shown in FIG. 1 includes, in order from the magnification side, a first lens group $G_1$ having a negative refractive power, a second lens group $G_2$ having a positive refractive power, a third lens group $G_3$ having a positive or negative refractive power, a fourth lens group $G_4$ having a positive refractive power, a fifth lens group $G_5$ having a positive or negative refractive power, and a sixth lens group $G_6$ having a positive refractive power. The lens system is nearly telecentric on the reduction side. In addition, on the reduction side of the sixth lens group $G_6$, there are also arranged a color synthesizing or an illumination light splitting unit 2 and an image display surface 1 (hereinafter, may be referred to as a "display surface 1") of a light valve (DMD or a transmissive or reflective liquid crystal display panel). Here, the reference sign "Z" in the drawing represents an optical axis.

Furthermore, although not shown in FIG. 1, a mask (which is similar to a mask 3 in FIGS. 3 and 4) for blocking peripheral rays may be properly disposed at various appropriate positions. In addition, examples of the mask include not only a so-called stationary aperture diaphragm having a stationary aperture diameter but also a so-called variable aperture diaphragm having a variable aperture diaphragm. Moreover, the mask may be configured to be moved along the optical axis. The mask may be moved integrally with a given lens group, or may be moved independent of the given lens group. The number of masks provided may be two or more.

In this case, the first lens group $G_1$ includes, in order from the magnification side, a first lens $L_1$ formed of a positive lens, a second lens $L_2$ formed of a negative lens, a third lens $L_3$ formed of a negative lens, and a fourth lens $L_4$ formed of a negative lens.

In addition, the second lens group $G_2$ includes, in order from the magnification side, a cemented lens formed by cementing a fifth lens $L_5$ formed of a negative lens and a sixth lens $L_6$ formed of a positive lens, and a seventh lens $L_7$ formed of a positive lens.

Furthermore, the third lens group $G_3$ includes, in order from the magnification side, an eighth lens $L_8$ formed of a positive lens having a convex surface directed to the magnification side (which is an example of a positive lens $L_P$ having a convex surface directed to the magnification side), and a ninth lens $L_9$ formed of a negative lens having a concave surface directed to the reduction side (which is an example of a negative lens $L_N$ having a concave surface directed to the reduction side).

In addition, the fourth lens group $G_4$ includes only a tenth lens $L_{10}$ formed of a positive lens. The fifth lens group $G_5$ includes, in order from the magnification side, an eleventh lens $L_{11}$ formed of a negative lens, a cemented lens formed by cementing a twelfth lens $L_{12}$ formed of a negative lens and a thirteenth lens $L_{13}$ formed of a positive lens, and a fourteenth lens $L_{14}$ formed of a positive lens. The sixth lens group $G_6$ includes only a fifteenth lens $L_{15}$ formed of a positive lens.

Furthermore, the lens configurations of the lens groups are not limited to the configuration mentioned above, and one or more negative lenses and/or positive lenses may be added thereto. However, it is necessary that the third lens group $G_3$ includes at least a positive lens having a convex surface directed to the magnification side and a negative lens having a concave surface directed to the reduction side.

As described above, the projection zoom lens system according to this embodiment is configured as a negative-lead zoom lens system. Thus, it is possible to easily achieve a wide angle, and it is also possible to secure an appropriate back focal length.

In addition, the projection zoom lens system according to this embodiment is configured to perform a zoom function by moving four lens groups of the second to fifth lens groups $G_2$ to $G_5$ during zooming. Specifically, the whole lens system is divided into six groups, and the four lens groups are independently moved during zooming so as to share the zoom function among the respective groups. Therefore, it is possible to improve the optical performance and suppress change of F number accompanied by zooming.

As can be seen from a movement locus of then lens groups shown in FIG. 1, three lens groups, the second to fourth lens groups $G_2$ to $G_4$, are configured to move toward the magnification side during zooming from the wide-angle end to the telephoto end.

Furthermore, in the third lens group $G_3$, the eighth lens $L_8$ and the ninth lens $L_9$ are disposed to face each other with a given airspace therebetween, and the reduction-side surface of the eighth lens $L_8$ and the magnification-side surface of the ninth lens $L_9$ are formed of flat surfaces. This configuration is advantageous in arrangement of the eighth lens $L_8$ and the ninth lens $L_9$ in a lens barrel. Thus, it is possible to reduce a possibility that the eighth lens $L_8$ or the ninth lens $L_9$ is mounted in a state where it falls down or that its optical axis position is deviated. In addition, it is possible to reduce performance deterioration which might be caused when the lens is mounted in the state mentioned above. Further, as shown in fourth Example (see FIG. 4) to be described later, it is possible to obtain the same effect even if the two lenses constituting the third lens group $G_3$ are configured to be cemented to each other. It is also possible to cancel performance deterioration caused by eccentricity of each lens by cementing the lenses.

In addition, in the zoom lens system according to this embodiment of the invention, refractive powers of the third lens group $G_3$ and fifth lens group $G_5$ may be appropriately adjusted.

Furthermore, the projection zoom lens system according to this embodiment is configured to satisfy the following conditional expressions (1A), (1B), (2), and (3):

$$5.0 \leq |f_{G3}/R_{LN-2}| \quad (1A)$$

$$|f_{G3}/R_{LN-1}| \leq 100.0 \quad (1B)$$

$$|R_{LN-2}/R_{LN-1}| \leq 0.8 \quad (2)$$

$$1.5 \leq |f_{G3}/f_{G4}| \quad (3)$$

where $f_{G3}$ denotes a focal length of the third lens group $G_3$, $R_{LN-2}$ denotes a radius of curvature of the reduction-side surface (the concave surface) of the negative lens $L_N$, $R_{LN-1}$ denotes a radius of curvature of the magnification-side surface of the negative lens $L_N$, and $f_{G4}$ denotes a focal length of the fourth lens group $G_4$.

Now, the technical significance of the conditional expressions (1A), (1B), (2), and (3) mentioned above will be described.

The conditional expressions (1A) and (1B) define a ratio of the focal length of the third lens group $G_3$ to the radius of curvature of the reduction-side surface (the concave surface) of the negative lens $L_N$ disposed in the third lens group $G_3$. If $|f_{G3}/R_{LN-2}|$ falls below the lower limit of the conditional expression (1A), the radius of curvature of the concave surface of the negative lens $L_N$ increases. Thus, fluctuation in the spherical aberration accompanied by zooming increases. It is preferable that the lower limit of the conditional expression (1A) is set to 8.0.

In contrast, if $|f_{G3}/R_{LN-2}|$ exceeds the upper limit of the conditional expression (1B), the focal length of the third lens group $G_3$ increases. Thus, a movement amount of the third lens group $G_3$ during zooming also increases. Hence, it is difficult to achieve compactness of the whole projection zoom lens system. In addition, it is preferable that the upper limit of the conditional expression (1B) is set to 80.0.

The conditional expression (2) defines a ratio of the radius of curvature of the reduction-side surface (the concave surface) of the negative lens $L_N$ disposed in the third lens group $G_3$ to the radius of curvature of the magnification-side surface thereof. If $|R_{LN-2}/R_{LN-1}|$ exceeds the upper limit of the conditional expression (2), the radius of curvature of the concave surface of the negative lens $L_N$ increases. Thus, fluctuation in the spherical aberration accompanied by zooming increases.

The conditional expression (3) defines a ratio of the focal length of the third lens group $G_3$ to the focal length of the fourth lens group $G_4$. If $|f_{G3}/f_{G4}|$ falls below the lower limit of the conditional expression (3), the focal length of the fourth lens group $G_4$ increases. Thus, a movement amount of the fourth lens group $G_4$ during zooming also increases. Hence, it is difficult to achieve compactness of the whole projection zoom lens system.

Figure 9:
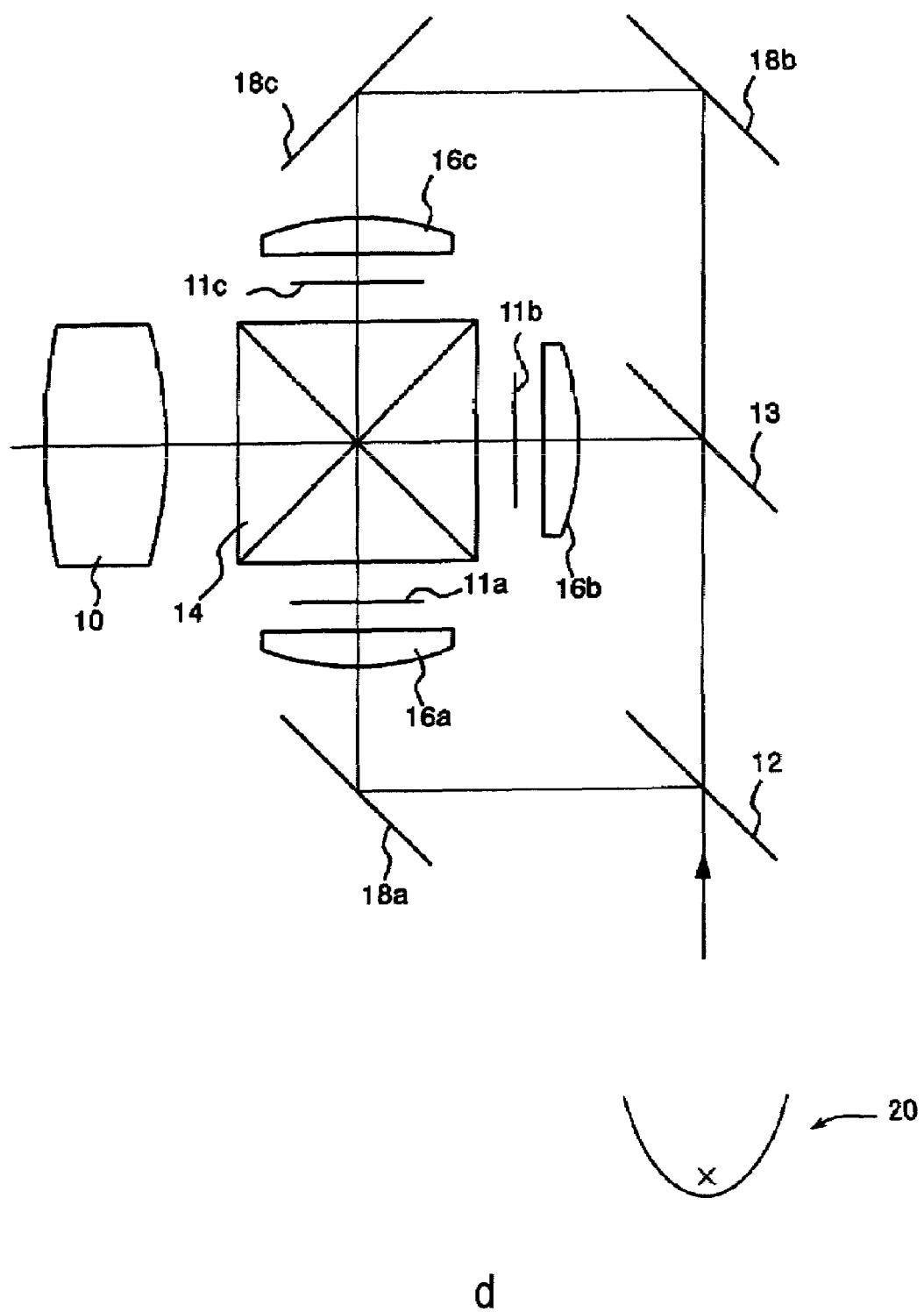
FIG. 9 is a schematic configuration diagram illustrating a projection type display apparatus according to an embodiment of the invention.

Next, a projection type display apparatus according to this embodiment of the invention will be briefly described. FIG. 9 is a schematic configuration diagram illustrating the projection type display apparatus according to the embodiment.

The projection type display apparatus shown in FIG. 9 has transmissive liquid crystal panels 11a to 11c as light valves, and employs the aforementioned projection zoom lens system according to the embodiment as a projection zoom lens system 10. In addition, between a light source 20 and a dichroic mirror 12, there is disposed an integrator (not shown in the drawing) such as fly-eye. From the light source 20, white rays travel through an illumination optical unit, are modulated by being incident on the liquid crystal panels 11a to 11c which correspond to three color rays (G light, B light, R light), are color-synthesized by a cross dichroic prism 14, and are projected by the projection zoom lens system 10 onto a screen (not shown in the drawing). This apparatus includes the dichroic mirrors 12 and 13 for color separation, the cross dichroic prism 14 for color synthesis, condenser lenses 16a to 16c, and total reflection mirrors 18a to 18c. The projection type display apparatus employs the projection zoom lens system according to this embodiment, and thus it is possible to embody a projection type display apparatus having a wide angle, good projection image quality, high brightness, and a compact size.

Furthermore, the projection type display apparatus shown in FIG. 9 is one embodiment of the invention, and may be modified in various forms. For example, the transmissive liquid crystal panel used as a light valve may be changed into a reflective liquid crystal panel or DMD.

EXAMPLES

Hereinafter, the projection zoom lens system according to embodiments of the invention will be further described with reference to specific Examples. In the following numerical data such as R and D are normalized so that the focal length of the whole system at the wide-angle end becomes equal to 1.

Example 1

FIG. 1 shows the schematic configuration of the projection zoom lens system according to Example 1. The projection zoom lens system includes, in order from the magnification side, a first lens group $G_1$ having a negative refractive power, a second lens group $G_2$ having a positive refractive power, a third lens group $G_3$ having a negative refractive power, a fourth lens group $G_4$ having a positive refractive power, a fifth lens group $G_5$ having a positive refractive power, and a sixth lens group $G_6$ having a positive refractive power. The lens system is nearly telecentric on the reduction side.

Here, the first lens group $G_1$ includes, in order from the magnification side, a first lens $L_1$ formed of a positive meniscus lens having a convex surface directed to the magnification side, a second lens $L_2$ formed of a negative meniscus lens having a convex surface directed to the magnification side, a third lens $L_3$ formed of a negative meniscus lens having a convex surface directed to the magnification side, and a fourth lens $L_4$ formed of a negative meniscus lens having a convex surface directed to the reduction side.

Furthermore, the second lens group $G_2$ includes, in order from the magnification side, a cemented lens formed by cementing a fifth lens $L_5$ formed of a biconcave lens and a sixth lens $L_6$ formed of a biconvex lens, and a seventh lens $L_7$ formed of a biconvex lens.

In addition, the third lens group $G_3$ includes, in order from the magnification side, an eighth lens $L_8$ (which is an example of the positive lens $L_P$ having the convex surface directed to the magnification side) formed of a plano-convex lens having a convex surface directed to the magnification side, and a ninth lens $L_9$ (which is an example of the negative lens $L_N$ having the concave surface directed to the reduction side) formed of a plano-concave lens having a concave surface directed to the reduction side.

Furthermore, the fourth lens group $G_4$ includes only a tenth lens $L_{10}$ formed of a biconvex lens. The fifth lens group $G_5$ includes, in order from the magnification side, an eleventh lens $L_{11}$ formed of a negative meniscus lens having a convex directed to the magnification side, a cemented lens formed by cementing a twelfth lens $L_{12}$ formed of a biconcave lens and a thirteenth lens $L_{13}$ formed of a biconvex lens, and a fourteenth lens $L_{14}$ formed of a biconvex lens. In addition, the sixth lens group $G_6$ includes only a fifteenth lens $L_{15}$ formed of a biconvex lens.

In Table 1, R represents a radius of curvature of each lens surface of the projection zoom lens system, D represents a center thickness of each lens and an airspace between lenses (hereinafter, may be collectively referred to as an "on-axis surface spacing"), N represents a refractive index of each lens at the d-line, and v represents an Abbe number of each lens at the d-line. In addition, numerical values of R, D, N and v are shown in the table 1. Furthermore, the numerals in the leftmost column of the table 1 represent an order from the magnification side (the same in Tables 2 to 4).

The lower part of Table 1 shows spaces between lens groups at the wide-angle end (WIDE) and at the telephoto end (TELE) (the same in the following Tables 2 to 4 when the lens system is focused on infinity).

TABLE 1

| | R | D | Nd | vd |
|---|---|---|---|---|
| 1 | 1.787 | 0.225 | 1.8061 | 40.9 |
| 2 | 5.808 | 0.004 | | |
| 3 | 2.013 | 0.062 | 1.4875 | 70.2 |
| 4 | 0.879 | 0.273 | | |
| 5 | 7.377 | 0.054 | 1.4875 | 70.2 |
| 6 | 0.994 | 0.319 | | |
| 7 | −1.360 | 0.059 | 1.5317 | 48.8 |
| 8 | −10.868 | (Variable 1) | | |
| 9 | −4.403 | 0.056 | 1.8052 | 25.4 |
| 10 | 1.196 | 0.335 | 1.7015 | 41.2 |
| 11 | −1.804 | 0.004 | | |
| 12 | 1.501 | 0.176 | 1.7725 | 49.6 |
| 13 | −32.623 | (Variable 2) | | |
| 14 | 1.034 | 0.175 | 1.7283 | 28.5 |
| 15 | ∞ | 0.027 | | |
| 16 | ∞ | 0.040 | 1.6889 | 31.1 |
| 17 | 0.828 | (Variable 3) | | |
| 18 | 5.638 | 0.048 | 1.6204 | 60.3 |

TABLE 1-continued

| 19 | −5.638 | (Variable 4) | | |
|---|---|---|---|---|
| 20 | 3.348 | 0.032 | 1.4875 | 70.2 |
| 21 | 1.183 | 0.156 | | |
| 22 | −0.596 | 0.041 | 1.7174 | 29.5 |
| 23 | 2.262 | 0.227 | 1.4970 | 81.5 |
| 24 | −0.843 | 0.004 | | |
| 25 | 10.591 | 0.181 | 1.7130 | 53.9 |
| 26 | −1.296 | (Variable 5) | | |
| 27 | 1.750 | 0.165 | 1.7859 | 44.2 |
| 28 | −8.020 | 0.346 | | |
| 29 | ∞ | 0.907 | 1.5163 | 64.1 |
| 30 | ∞ | | | |

| Variable spacing | WIDE | TELE |
|---|---|---|
| (Variable 1) | 0.412 | 0.099 |
| (Variable 2) | 0.006 | 0.237 |
| (Variable 3) | 0.838 | 0.146 |
| (Variable 4) | 0.019 | 0.593 |
| (Variable 5) | 0.006 | 0.207 |

As shown in Table 5, the projection zoom lens system according to Example 1 satisfies the conditional expressions (1A), (1B), (2), and (3).

Furthermore, FIG. 5 is aberration diagrams illustrating the spherical aberration, astigmatism, distortion, and lateral chromatic aberration of the projection zoom lens system according to Example 1 at the wide-angle end (WIDE, a magnification: 79 times (when the focus is performed by the first lens group $G_1$; the same applies to the followings) and the telephoto end (TELE, a magnification: 60 times). In addition, the astigmatism diagram shows aberrations with respect to the sagittal image plane and the tangential image plane (the same in FIGS. 6 to 8).

As can be seen from these aberration diagrams, according to the projection zoom lens system of Example 1, it is possible to extremely reduce fluctuation of the spherical aberration accompanied by zooming. In addition, it is also possible to satisfactorily correct various aberrations, especially, the astigmatism and the lateral chromatic aberration. Moreover, in Example 1, the distortion is in the allowable range of ±2%, and thus the projection zoom lens system can exhibit good performance.

Example 2

FIG. 2 shows the schematic configuration of a projection zoom lens system according to Example 2. The projection zoom lens system includes, in order from the magnification side, a first lens group $G_1$ having a negative refractive power, a second lens group $G_2$ having a positive refractive power, a third lens group $G_3$ having a negative refractive power, a fourth lens group $G_4$ having a positive refractive power, a fifth lens group $G_5$ having a negative refractive power, and a sixth lens group $G_6$ having a positive refractive power. The lens system is nearly telecentric on the reduction side thereof.

Here, the first lens group $G_1$ includes, in order from the magnification side, a first lens $L_1$ formed of a positive meniscus lens having a convex surface directed to the magnification side, a second lens $L_2$ formed of a negative meniscus lens having a convex surface directed to the magnification side, a third lens $L_3$ formed of a biconcave lens, and a fourth lens $L_4$ formed of a biconcave lens.

Furthermore, the second lens group $G_2$ includes, in order from the magnification side, a cemented lens formed by cementing a fifth lens $L_5$ formed of a negative meniscus lens having a convex surface directed to the magnification side and a sixth lens $L_6$ formed of a biconvex lens, and a seventh lens $L_7$ formed of a positive meniscus lens having a convex surface directed to the magnification side.

In addition, the third lens group $G_3$ includes, in order from the magnification side, an eighth lens $L_9$ (which is an example of the positive lens $L_P$ having the convex surface directed to the magnification side) formed of a plano-convex lens having a convex surface directed to the magnification side, and a ninth lens $L_9$ (which is an example of the negative lens $L_N$ having the concave surface directed to the reduction side) formed of a plano-concave lens having a concave surface directed to the reduction side.

Furthermore, the fourth lens group $G_4$ includes only a tenth lens $L_{10}$ formed of a biconvex lens. The fifth lens group $G_5$ includes, in order from the magnification side, an eleventh lens $L_{11}$ formed of a biconcave lens, and a cemented lens formed by cementing a twelfth lens $L_{12}$ formed of a biconcave lens and a thirteenth lens $L_{13}$ formed of a biconvex lens, and a fourteenth lens $L_{14}$ formed of a biconvex lens. In addition, the sixth lens group $G_6$ includes only a fifteenth lens $L_{15}$ formed of a biconvex lens.

Table 2 shows radiuses of curvature R of the lens surfaces of the projection zoom lens system, on-axis surface spacings D of the lenses, refractive indices N of the lenses at the d-line and Abbe numbers ν of the lenses at the d-line.

TABLE 2

|  | R | D | Nd | νd |
|---|---|---|---|---|
| 1 | 2.020 | 0.157 | 1.8010 | 35.0 |
| 2 | 14.565 | 0.152 |  |  |
| 3 | 2.121 | 0.053 | 1.4875 | 70.2 |
| 4 | 1.188 | 0.131 |  |  |
| 5 | −26.250 | 0.040 | 1.4875 | 70.2 |
| 6 | 0.868 | 0.198 |  |  |
| 7 | −1.633 | 0.036 | 1.5317 | 48.8 |
| 8 | 10.043 | (Variable 1) |  |  |
| 9 | 1.892 | 0.054 | 1.8052 | 25.4 |
| 10 | 1.002 | 0.161 | 1.4970 |  |
| 11 | −1.968 | 0.003 |  |  |
| 12 | 0.938 | 0.082 | 1.7995 | 42.2 |
| 13 | 2.050 | (Variable 2) |  |  |
| 14 | 0.922 | 0.108 | 1.5163 | 64.1 |
| 15 | ∞ | 0.018 |  |  |
| 16 | ∞ | 0.029 | 1.4875 | 70.2 |
| 17 | 0.663 | (Variable 3) |  |  |
| 18 | 0.887 | 0.071 | 1.5891 | 61.1 |
| 19 | −16.482 | (Variable 4) |  |  |
| 20 | −6.062 | 0.025 | 1.6398 | 34.5 |
| 21 | 0.766 | 0.131 |  |  |
| 22 | −0.461 | 0.029 | 1.6477 | 33.8 |
| 23 | 1.552 | 0.193 | 1.4970 | 81.5 |
| 24 | −0.594 | 0.003 |  |  |
| 25 | 2.425 | 0.107 | 1.8000 | 29.9 |
| 26 | −2.425 | (Variable 5) |  |  |
| 27 | 2.037 | 0.099 | 1.7859 | 44.2 |
| 28 | −5.577 | 0.280 |  |  |
| 29 | ∞ | 0.732 | 1.5163 | 64.1 |
| 30 | ∞ |  |  |  |

| Variable spacing | WIDE | TELE |
|---|---|---|
| (Variable 1) | 0.891 | 0.063 |
| (Variable 2) | 0.134 | 0.241 |
| (Variable 3) | 0.621 | 0.371 |
| (Variable 4) | 0.065 | 0.364 |
| (Variable 5) | 0.005 | 0.678 |

As shown in Table 5, the projection zoom lens system according to Example 2 satisfies the conditional expressions (1A), (1B), (2), and (3).

Furthermore, FIG. 6 is aberration diagrams illustrating the spherical aberration, astigmatism, distortion, and lateral chromatic aberration of the projection zoom lens system according to Example 2 at the wide-angle end (WIDE, a magnification: 84 times) and the telephoto end (TELE, a magnification: 83 times).

As can be seen from these aberration diagrams, according to the projection zoom lens system of Example 2, it is possible to extremely reduce fluctuation of spherical aberration accompanied by zooming. In addition, it is also possible to satisfactorily correct various aberrations, especially, the astigmatism and the lateral chromatic aberration. Moreover, in Example 2, the distortion is in the allowable range of ±2%, and thus the projection zoom lens system can exhibit good performance.

Example 3

Figure 3:
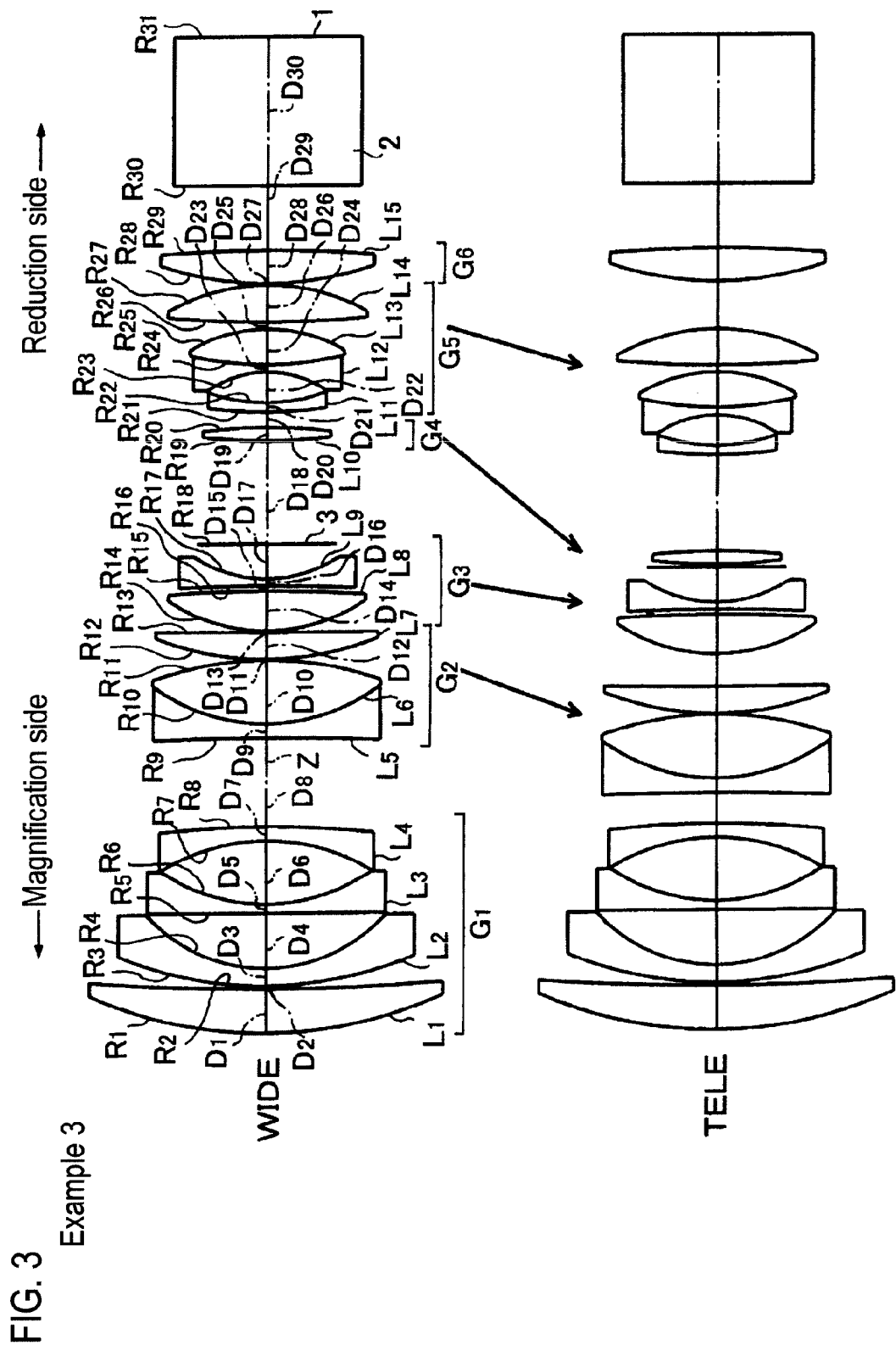
FIG. 3 is a schematic diagram illustrating the configuration of a projection zoom lens system according to Example 3.

FIG. 3 shows the schematic configuration of a projection zoom lens system according to Example 3. The projection zoom lens system includes, in order from the magnification side, a first lens group $G_1$ having a negative refractive power, a second lens group $G_2$ having a positive refractive power, a third lens group $G_3$ having a positive refractive power, a mask 3, a fourth lens group $G_4$ having a positive refractive power, a fifth lens group $G_5$ having a negative refractive power, and a sixth lens group $G_6$ having a positive refractive power. The lens system is nearly telecentric on the reduction side.

Here, the first lens group $G_1$ includes, in order from the magnification side, a first lens $L_1$ formed of a positive meniscus lens having a convex surface directed to the magnification side, a second lens $L_2$ formed of a negative meniscus lens having a convex surface directed to the magnification side, a third lens $L_3$ formed of a negative meniscus lens having a concave surface directed to the reduction side, and a fourth lens $L_4$ formed of a negative meniscus lens having a convex surface directed to the reduction side.

Further, the second lens group $G_2$ includes, in order from the magnification side, a cemented lens formed by cementing a fifth lens $L_5$ formed of a biconcave lens and a sixth lens $L_6$ formed of a biconvex lens, and a seventh lens $L_7$ formed of a positive meniscus lens having a convex surface directed to the magnification side.

Furthermore, the third lens group $G_3$ includes, in order from the magnification side, an eighth lens $L_8$ (which is an example of the positive lens $L_P$ having the convex surface directed to the magnification side) formed of a biconvex lens, and a ninth lens $L_9$ (which is an example of the negative lens $L_N$ having the concave surface directed to the reduction side) formed of a biconcave lens. Furthermore, a mask 3 is moved integrally with the third lens group $G_3$ during zooming.

Furthermore, the fourth lens group $G_4$ includes only a tenth lens $L_{10}$ formed of a biconvex lens. The fifth lens group $G_5$ includes, in order from the magnification side, an eleventh lens $L_{11}$ formed of a negative meniscus lens having a convex surface directed to the magnification side, a cemented lens formed by cementing a twelfth lens $L_{12}$ formed of a biconcave lens and a thirteenth lens $L_{13}$ formed of a biconvex lens, and a fourteenth lens $L_{14}$ formed of a biconvex lens. In addition, the sixth lens group $G_6$ includes only a fifteenth lens $L_{15}$ formed of a biconvex lens.

Table 3 shows radiuses of curvature R of the lens surfaces of the projection zoom lens system, on-axis surface spacings D of the lenses, refractive indices N of the lenses at the d-line and Abbe numbers ν of the lenses at the d-line.

TABLE 3

| | R | D | Nd | vd |
|---|---|---|---|---|
| 1 | 2.742 | 0.267 | 1.7130 | 53.9 |
| 2 | 14.859 | 0.019 | | |
| 3 | 2.397 | 0.106 | 1.4875 | 70.2 |
| 4 | 0.999 | 0.335 | | |
| 5 | 352.040 | 0.058 | 1.4970 | 81.5 |
| 6 | 1.180 | 0.379 | | |
| 7 | −1.277 | 0.086 | 1.4875 | 70.2 |
| 8 | −5.934 | (Variable 1) | | |
| 9 | −19.078 | 0.086 | 1.8061 | 33.3 |
| 10 | 1.191 | 0.389 | 1.6779 | 55.3 |
| 11 | −2.092 | 0.004 | | |
| 12 | 1.881 | 0.165 | 1.7725 | 49.6 |
| 13 | 52.340 | (Variable 2) | | |
| 14 | 1.100 | 0.242 | 1.6700 | 39.3 |
| 15 | −9.210 | 0.031 | | |
| 16 | −12.627 | 0.044 | 1.5814 | 40.7 |
| 17 | 0.824 | 0.211 | | |
| 18 | ∞ | (Mask Variable 3) | | |
| 19 | 3.397 | 0.081 | 1.5163 | 64.1 |
| 20 | −3.797 | (Variable 4) | | |
| 21 | 2.902 | 0.058 | 1.4875 | 70.2 |
| 22 | 1.075 | 0.187 | | |
| 23 | −0.659 | 0.046 | 1.7174 | 29.5 |
| 24 | 2.077 | 0.217 | 1.4970 | 81.5 |
| 25 | −0.953 | 0.043 | | |
| 26 | 6.819 | 0.224 | 1.6180 | 63.3 |
| 27 | −1.274 | (Variable 5) | | |
| 28 | 2.056 | 0.200 | 1.8061 | 40.9 |
| 29 | −8.577 | 0.393 | | |
| 30 | ∞ | 0.908 | 1.5163 | 64.1 |
| 31 | ∞ | | | |

| Variable spacing | WIDE | TELE |
|---|---|---|
| (Variable 1) | 0.521 | 0.170 |
| (Variable 2) | 0.010 | 0.200 |
| (Variable 3) | 0.626 | 0.019 |
| (Variable 4) | 0.096 | 0.584 |
| (Variable 5) | 0.010 | 0.289 |

As shown in Table 5, the projection zoom lens system according to Example 3 satisfies the conditional expressions (1A), (1B), (2), and (3).

Furthermore, FIG. 7 is aberration diagrams illustrating the spherical aberration, astigmatism, distortion, and lateral chromatic aberration of the projection zoom lens system according to Example 3 at the wide-angle end (WIDE, a magnification: 79 times) and the telephoto end (TELE, a magnification: 60 times).

As can be seen from these aberration diagrams, according to the projection zoom lens system of Example 3, it is possible to extremely reduce fluctuation of the spherical aberration accompanied by zooming. In addition, it is also possible to satisfactorily correct various aberrations, especially, the astigmatism and the lateral chromatic aberration. Moreover, in Example 3, the distortion is in the allowable range of ±2%, and thus the projection zoom lens system can exhibit good performance.

Example 4

Figure 4:
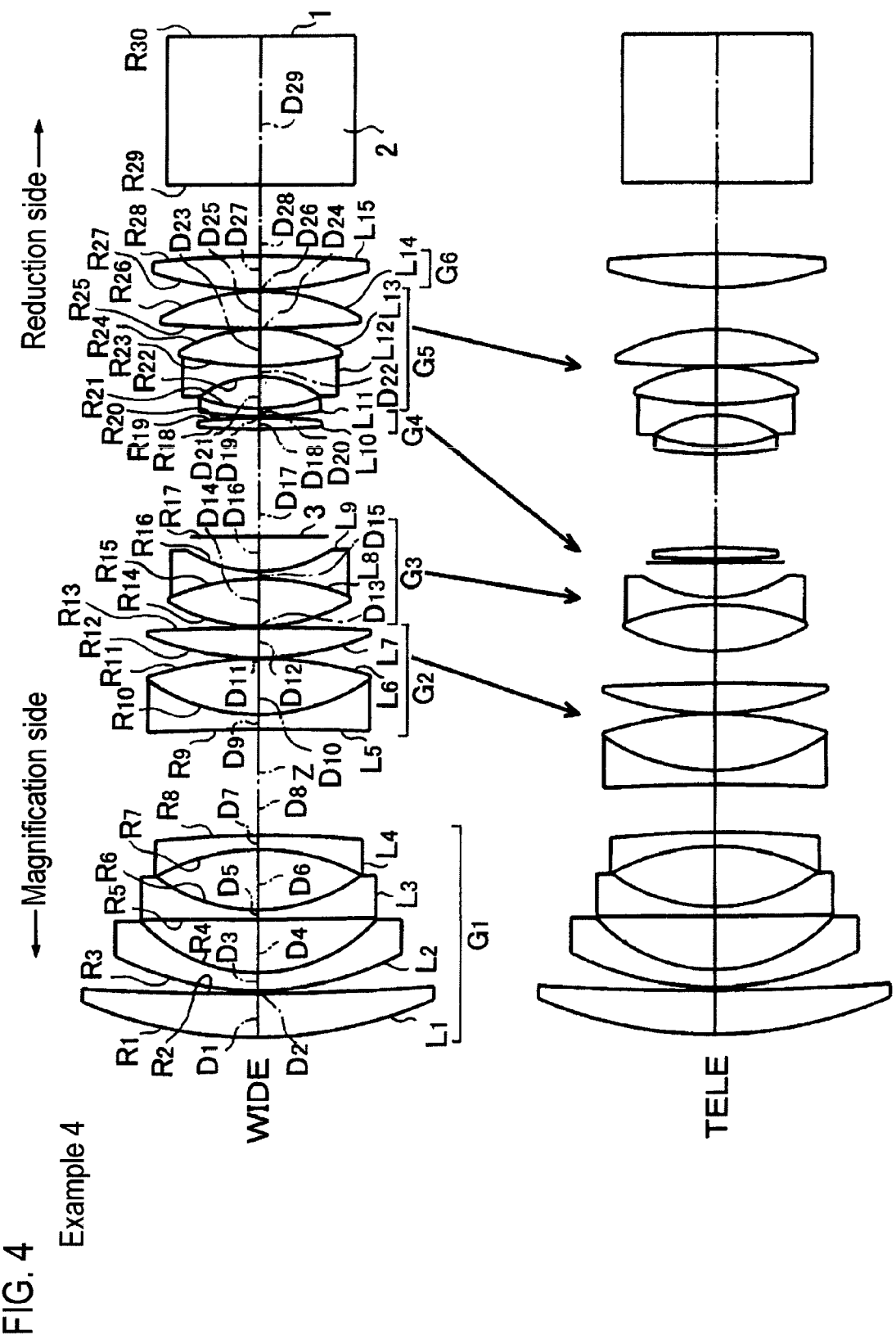
FIG. 4 is a schematic diagram illustrating the configuration of a projection zoom lens system according to Example 4.

FIG. 4 shows the schematic configuration of a projection zoom lens system according to Example 4. The projection zoom lens system includes, in order from the magnification side, a first lens group $G_1$ having a negative refractive power, a second lens group $G_2$ having a positive refractive power, a third lens group $G_3$ having a negative refractive power, a mask 3, a fourth lens group $G_4$ having a positive refractive power, a fifth lens group $G_5$ having a negative refractive power, and a sixth lens group $G_6$ having a positive refractive power. The lens system is nearly telecentric on the reduction side.

Here, the first lens group $G_1$ includes, in order from the magnification side, a first lens $L_1$ formed of a positive meniscus lens having a convex surface directed to the magnification side, a second lens $L_2$ formed of a negative meniscus lens having a convex surface directed to the magnification side, a third lens $L_3$ formed of a negative meniscus lens having a convex surface directed to the magnification side, and a fourth lens $L_4$ formed of a negative meniscus lens having a convex surface directed to the reduction side.

Furthermore, the second lens group $G_2$ includes, in order from the magnification side, a cemented lens formed by cementing a fifth lens $L_5$ formed of a biconcave lens and a sixth lens $L_6$ formed of a biconvex lens, and a seventh lens $L_7$ formed of a biconvex lens.

Furthermore, the third lens group $G_3$ includes a cemented lens formed by cementing, in order from the magnification side, an eighth lens $L_9$ (which is an example of the positive lens $L_P$ having the convex surface directed to the magnification side) formed of a biconvex lens and a ninth lens $L_9$ (which is an example of the negative lens $L_N$ having the concave surface directed to the reduction side) formed of a biconcave lens. Furthermore, a mask 3 is moved integrally with the third lens group $G_3$ during zooming.

Furthermore, the fourth lens group $G_4$ includes only a tenth lens $L_{10}$ formed of a biconvex lens. The fifth lens group $G_5$ includes, in order from the magnification side, an eleventh lens $L_{11}$ formed of a negative meniscus lens having a convex surface directed to the magnification side, a cemented lens formed by cementing a twelfth lens $L_{12}$ formed of a biconcave lens and a thirteenth lens $L_{13}$ formed of a biconvex lens, and a fourteenth lens $L_{14}$ formed of a biconvex lens. In addition, the sixth lens group $G_6$ includes only a fifteenth lens $L_{15}$ formed of a biconvex lens.

Table 4 shows radiuses of curvature R of the lens surfaces of the projection zoom lens system, on-axis surface spacings D of the lenses, refractive indices N of the lenses at the d-line and Abbe numbers ν of the lenses at the d-line.

TABLE 4

| | R | D | Nd | vd |
|---|---|---|---|---|
| 1 | 2.740 | 0.268 | 1.6516 | 58.5 |
| 2 | 16.367 | 0.019 | | |
| 3 | 1.935 | 0.106 | 1.4875 | 70.2 |
| 4 | 0.994 | 0.326 | | |
| 5 | 114.588 | 0.058 | 1.4970 | 81.5 |
| 6 | 1.085 | 0.367 | | |
| 7 | −1.357 | 0.086 | 1.4875 | 70.2 |
| 8 | −6.598 | (Variable 1) | | |
| 9 | −14.637 | 0.086 | 1.8061 | 33.3 |
| 10 | 1.226 | 0.343 | 1.6968 | 55.5 |
| 11 | −2.277 | 0.004 | | |
| 12 | 1.825 | 0.185 | 1.7725 | 49.6 |
| 13 | −14.505 | (Variable 2) | | |
| 14 | 1.128 | 0.289 | 1.5481 | 45.8 |
| 15 | −1.484 | 0.044 | 1.5174 | 52.4 |
| 16 | 0.848 | 0.211 | | |
| 17 | ∞ | (Mask Variable 3) | | |
| 18 | 5.429 | 0.071 | 1.4875 | 70.2 |
| 19 | −3.599 | (Variable 4) | | |
| 20 | 2.409 | 0.048 | 1.5182 | 58.9 |
| 21 | 1.084 | 0.193 | | |
| 22 | −0.662 | 0.067 | 1.7174 | 29.5 |
| 23 | 2.055 | 0.228 | 1.4970 | 81.5 |
| 24 | −0.998 | 0.004 | | |
| 25 | 6.503 | 0.226 | 1.6180 | 63.3 |
| 26 | −1.286 | (Variable 5) | | |
| 27 | 2.144 | 0.200 | 1.8061 | 40.9 |
| 28 | −7.217 | 0.432 | | |

TABLE 4-continued

| 29 | ∞ | 0.907 | 1.5163 | 64.1 |
|----|---|-------|--------|------|
| 30 | ∞ | | | |

| Variable spacing | WIDE | TELE |
|---|---|---|
| (Variable 1) | 0.625 | 0.268 |
| (Variable 2) | 0.010 | 0.194 |
| (Variable 3) | 0.655 | 0.019 |
| (Variable 4) | 0.010 | 0.569 |
| (Variable 5) | 0.010 | 0.258 |

As shown in Table 5, the projection zoom lens system according to Example 4 satisfies the conditional expressions (1A), (1B), (2), and (3).

Furthermore, FIG. 8 is aberration diagrams illustrating the spherical aberration, astigmatism, distortion, and lateral chromatic aberration of the projection zoom lens system according to Example 4 at the wide-angle end (WIDE, a magnification: 79 times) and the telephoto end (TELE, a magnification: 60 times).

As can be seen from these aberration diagrams, according to the projection zoom lens system of Example 4, it is possible to extremely reduce fluctuation of the spherical aberration accompanied by zooming. In addition, it is also possible to satisfactorily correct various aberrations, especially, the astigmatism and the lateral chromatic aberration. Moreover, in Example 4, the distortion is in the allowable range of ±2%, and thus the projection zoom lens system can exhibit good performance.

TABLE 5

| | Conditional expressions (1A), (1B) | Conditional expression (2) | Conditional expression (3) |
|---|---|---|---|
| Example 1 | 31.5 | 0.0 | 5.7 |
| Example 2 | 11.6 | 0.0 | 5.4 |
| Example 3 | 67.3 | 0.1 | 15.9 |
| Example 4 | 28.8 | 0.6 | 5.5 |

What is claimed is:

1. A projection zoom lens system comprising, in order from a magnification side:

a first lens group having a negative refractive power;

a second lens group having a positive refractive power;

a third lens group having a positive or negative refractive power;

a fourth lens group having a positive refractive power;

a fifth lens group having a positive or negative refractive power; and a sixth lens group having a positive refractive power, wherein the projection zoom lens system is configured to be nearly telecentric on a reduction side, during zooming, four lens groups including the second to fifth lens groups are moved while the first and sixth lens groups remain stationary, the third lens group includes, at least, a positive lens $L_P$ having a convex surface directed to the magnification side, and a negative lens $L_N$ having a concave surface directed to the reduction side, the concave surface having a curvature larger than a magnification-side surface of the negative lens $L_N$, and the following conditional expression (1A) is satisfied:

$$5.0 \leq |f_{G3}/R_{LN-2}| \quad (1A)$$

where $f_{G3}$ denotes a focal length of the third lens group, and $R_{LN-2}$ denotes a radius of curvature of the reduction-side surface of the negative lens $L_N$.

2. The projection zoom lens system according to claim 1, wherein the following conditional expression (2) is satisfied:

$$|R_{LN-2}/R_{LN-1}| \leq 0.8 \quad (2)$$

where $R_{LN-1}$ denotes a radius of curvature of the magnification-side surface of the negative lens $L_N$.

3. The projection zoom lens system according to claim 2, wherein the third lens group consists of the positive lens $L_P$ and the negative lens $L_N$, and the positive lens $L_P$ and the negative lens $L_N$ are arranged in order from the magnification side.

4. The projection zoom lens system according to claim 3, wherein the positive lens $L_P$ and the negative lens $L_N$ are disposed with a given airspace therebetween, and a reduction-side surface of the positive lens $L_P$ and the magnification-side surface of the negative lens $L_N$ are formed of flat surfaces.

5. The projection zoom lens system according to claim 2, wherein the positive lens $L_P$ and the negative lens $L_N$ are cemented to each other.

6. The projection zoom lens system according to claim 2, wherein the sixth lens group consists of one positive lens, and the following conditional expression (1B) is satisfied $$|f_{G3}/R_{LN-2}| \leq 100.0 \quad (1B).$$

7. The projection zoom lens system according to claim 2, wherein the following conditional expression (3) is satisfied:

$$1.5 \leq |f_{G3}/f_{G4}| \quad (3)$$

where $f_{G4}$ denotes a focal length of the fourth lens group.

8. The projection zoom lens system according to claim 1, wherein the third lens group consists of the positive lens $L_P$ and the negative lens $L_N$, and the positive lens $L_P$ and the negative lens $L_N$ are arranged in order from the magnification side.

9. The projection zoom lens system according to claim 8, wherein the positive lens $L_P$ and the negative lens $L_N$ are disposed with a given airspace therebetween, and a reduction-side surface of the positive lens $L_P$ and the magnification-side surface of the negative lens $L_N$ are formed of flat surfaces.

10. The projection zoom lens system according to claim 1, wherein the positive lens $L_P$ and the negative lens $L_N$ are cemented to each other.

11. The projection zoom lens system according to claim 1, wherein the sixth lens group consists of one positive lens, and the following conditional expression (1B) is satisfied $$(1B). \quad |f_{G3}/R_{LN-2}| \leq 100.0$$

12. The projection zoom lens system according to claim 1, wherein the following conditional expression (3) is satisfied:

$$1.5 \leq |f_{G3}/f_{G4}| \quad (3)$$

where $f_{G4}$ denotes a focal length of the fourth lens group.

13. A projection display apparatus comprising:
 a light source;
 a light valve;
 an illumination optical unit that guides a light beam emitted from the light source to the light valve; and
 the projection zoom lens system according to claim 1, wherein
 the light beam emitted from the light source is optically modulated by the light valve, and is projected onto a screen by the projection zoom lens system.

* * * * *